US008255159B1

(12) United States Patent
Bierbaum et al.

(10) Patent No.: US 8,255,159 B1
(45) Date of Patent: Aug. 28, 2012

(54) TRANSIT PAYMENT AND HANDSET NAVIGATION INTEGRATION

(75) Inventors: Christopher J. Bierbaum, Overland Park, KS (US); Robin D. Katzer, Olathe, KS (US); Todd N. Koellner, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 542 days.

(21) Appl. No.: 12/349,509

(22) Filed: Jan. 6, 2009

(51) Int. Cl.
*G01C 21/00* (2006.01)

(52) U.S. Cl. ........ 701/466; 701/117; 701/408; 701/409; 701/410; 701/411; 701/445; 701/467; 701/532; 235/382; 235/384; 705/13; 340/5.2; 340/988; 340/994

(58) Field of Classification Search .................... 701/19, 701/23–25, 27, 117, 200–202, 207, 209, 701/211, 213; 235/382, 384, 375; 340/5.1, 340/5.2, 5.27, 5.3, 5.32, 5.5, 5.61, 5.64, 5.8, 340/12.51, 12.52, 13.26, 928, 988–996; 705/13
See application file for complete search history.

(56) References Cited

U.S. PATENT DOCUMENTS

| | | | |
|---|---|---|---|
| 5,298,726 | A | 3/1994 | Aubrey |
| 5,590,038 | A | 12/1996 | Pitroda |
| 5,819,234 | A | 10/1998 | Slavin et al. |
| 5,991,749 | A | 11/1999 | Morrill, Jr. |
| 6,003,776 | A | 12/1999 | Drupsteen |
| 6,736,317 | B1 | 5/2004 | McDonald et al. |
| 7,224,291 | B2 | 5/2007 | Hassett |
| 7,356,541 | B1 | 4/2008 | Doughty |
| 7,527,208 | B2 | 5/2009 | Hammad et al. |
| 7,562,818 | B1 | 7/2009 | Bierbaum et al. |
| 7,587,332 | B2 | 9/2009 | Andrews et al. |
| 7,797,248 | B1 | 9/2010 | Bierbaum et al. |
| 7,911,382 | B2 * | 3/2011 | Liu et al. .................. 342/357.64 |
| 7,922,084 | B2 | 4/2011 | Ishibashi et al. |
| 8,126,769 | B1 | 2/2012 | Bierbaum et al. |
| 8,181,867 | B1 | 5/2012 | Bierbaum et al. |
| 2002/0002534 | A1 | 1/2002 | Davis et al. |
| 2002/0004762 | A1 | 1/2002 | Izumoto |
| 2002/0133409 | A1 | 9/2002 | Sawano et al. |
| 2002/0161729 | A1 | 10/2002 | Andrews |
| 2003/0019927 | A1 | 1/2003 | Lindgren et al. |

(Continued)

FOREIGN PATENT DOCUMENTS

GB 2152720 A 8/1985

OTHER PUBLICATIONS

Office Action dated Feb. 17, 2011, U.S. Appl. No. 12/187,953, filed on Aug. 7, 2008.

(Continued)

*Primary Examiner* — Hussein Elchanti
*Assistant Examiner* — Rami Khatib

(57) ABSTRACT

A mobile electronic device is disclosed. The mobile electronic device comprises a near-field-communications receiver and an application. The near-field-communication transceiver receives identification information from at least one of a transit vehicle and a transit platform. The application, when executed on the mobile electronic device, receives a transit destination as entered into the mobile electronic device. Based on the identification information and a transit system route map, the application presents a notification on the mobile electronic device that the identification information does not agree with the transit destination.

9 Claims, 5 Drawing Sheets

U.S. PATENT DOCUMENTS

| | | | | |
|---|---|---|---|---|
| 2004/0016801 | A1 | 1/2004 | Newsome et al. | |
| 2004/0139018 | A1 | 7/2004 | Anderson et al. | |
| 2005/0125317 | A1 | 6/2005 | Winkelman et al. | |
| 2006/0189297 | A1* | 8/2006 | Jung | 455/406 |
| 2007/0034107 | A1* | 2/2007 | Barbeau et al. | 104/307 |
| 2007/0150949 | A1 | 6/2007 | Futamura et al. | |
| 2007/0210936 | A1* | 9/2007 | Nicholson | 340/988 |
| 2008/0068221 | A1* | 3/2008 | Park | 340/994 |
| 2008/0116264 | A1 | 5/2008 | Hammad et al. | |
| 2008/0156873 | A1 | 7/2008 | Wilhelm et al. | |
| 2008/0201212 | A1 | 8/2008 | Hammad et al. | |
| 2008/0208681 | A1 | 8/2008 | Hammad et al. | |
| 2009/0002237 | A1* | 1/2009 | Nonoyama | 342/450 |
| 2009/0015398 | A1* | 1/2009 | Bhogal et al. | 340/539.13 |
| 2010/0121563 | A1* | 5/2010 | Chavez et al. | 701/201 |
| 2010/0292921 | A1* | 11/2010 | Zachariah et al. | 701/209 |

OTHER PUBLICATIONS

Balaban, Dan, "Japan Goes Mobile With Transit Ticketing," Card Technology, May 2006, vol. 11, Issue 5, pp. 18-20.
Bierbaum, Christopher J., et al., Patent Application entitled "Single Transit Card to Multiple Rider Trip Methods and Architecture," filed Dec. 22, 2008, U.S. Appl. No. 12/342,066.
Bierbaum, Christopher J., et al., Patent Application entitled "Transit Card State Sequence Self-Help Correction," filed Aug. 7, 2008, U.S. Appl. No. 12/187,953.
Bierbaum, Christopher J., et al., Patent Application entitled "Transit Card Credit Authorization," filed Jan. 6, 2009, U.S. Appl. No. 12/349,513.
Gregoire, Lisa, "Visa Removes Canada 3000 Credit Charge," Edmonton Journal, Mar. 9, 2002, p. B.7, Edmonton, Alta.
Office Action dated May 10, 2010, U.S. Appl. No. 12/187,953, filed Aug. 7, 2008.
Final Office Action dated Oct. 20, 2010, U.S. Appl. No. 12/187,953, filed Aug. 7, 2008.
Final Office Action dated Jan. 4, 2012, U.S. Appl. No. 12/342,066, filed Dec. 22, 2008.
Notice of Allowance dated Oct. 17, 2011, U.S. Appl. No. 12/187,953, filed Aug. 7, 2008.
Pre-Interview Communication dated Dec. 7, 2011, U.S. Appl. No. 12/349,513, filed Jan. 6, 2009.
Notice of Allowance dated Jan. 20, 2012, U.S. Appl. No. 12/349,513, filed Jan. 6, 2009.
Office Action with Restriction Requirement dated Jun. 1, 2011, U.S. Appl. No. 12/342,066, filed Dec. 22, 2008.
Office Action dated Aug. 4, 2011, U.S. Appl. No. 12/342,066, filed Dec. 22, 2008.
Final Office Action dated Aug. 4, 2011, U.S. Appl. No. 12/187,953, filed Aug. 7, 2008.
Notice of Allowance, dated Mar. 22, 2012, U.S. Appl. No. 12/342,066, filed on Dec. 22, 2008.

* cited by examiner

TRANSIT PAYMENT AND HANDSET NAVIGATION INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Public transit systems in many cities may be comprised of multiple modes of transportation including buses, trains, light rails, and subways, each using various methods to receive payment for fares. In some transportation systems, a point of sale (POS) terminal may be used to purchase a ticket. Mobile devices are used in some transit systems as a means to pay a transit fare using near-field-communications (NFC).

Some stations, for example a train station, may have multiple trains all leaving from the same platform at approximately the same time. A subway system may have multiple levels of trains underground, all accessible from the same station. A bus route may require one or more transfers to reach a destination.

SUMMARY

In an embodiment, a mobile electronic device is provided. The mobile electronic device comprises a near-field-communications receiver and an application. The near-field-communication transceiver receives identification information from at least one of a transit vehicle and a transit platform. The application, when executed on the mobile electronic device, receives a transit destination as entered into the mobile electronic device. Based on the identification information and a transit system route map, the application presents a notification on the mobile electronic device that the identification information does not agree with the transit destination.

In another embodiment, a mobile electronic device is provided. The mobile electronic device comprises a near-field-communication transceiver, a self location component, and an application. The near-field-communications transceiver requests and receives a route map from the transit system. The application, when executed on the mobile electronic device receives a transit destination entered into the mobile device. The application analyzes a plurality of locations of the mobile electronic device at a succession of times provided by the self-location component to determine a direction of motion of the mobile electronic device. The application then presents a notification on the mobile electronic device that the route map and the direction of motion of the mobile electronic device do not agree with the transit destination.

In another embodiment, a method of a mobile electronic device providing navigation feedback is provided. The method comprises entering a destination designation on a mobile electronic device. When an electronic public transit route map is received, the method comprises determining a sequence of locations of the mobile electronic device and determining a direction of travel based on the sequence of locations of the mobile electronic device. If the mobile electronic device is going in the wrong direction, the method comprises determining that the direction of travel does not agree with the destination designation based on the public transit route map, determining a transit system transfer action to correct the direction of travel, and presenting a notification of a recommended transit system transfer action on a display of the mobile electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
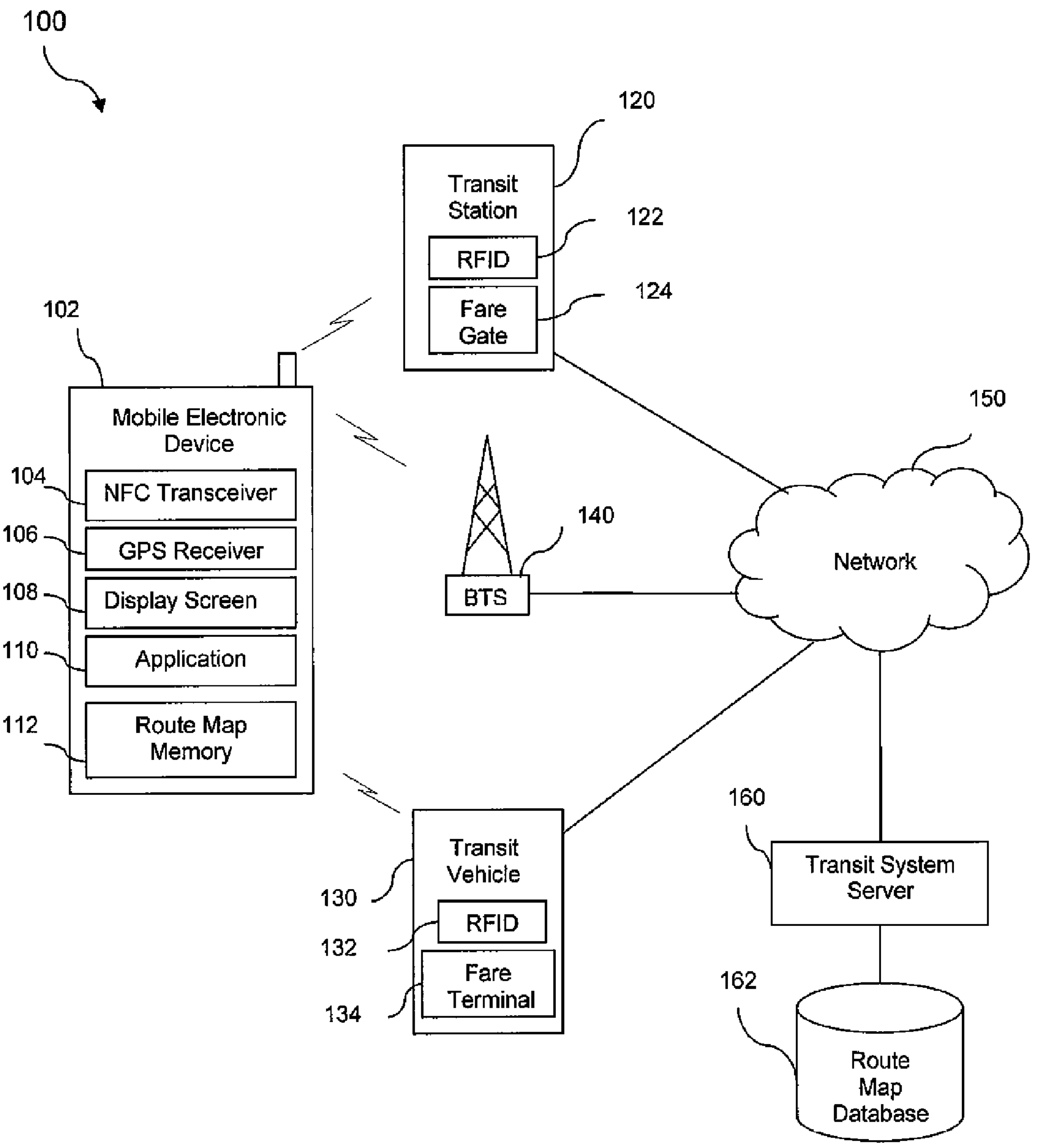
FIG. 1. illustrates a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A method of using an electronic mobile device to provide navigation feedback relating to a transit system is disclosed. In an embodiment, a mobile electronic device that is used to purchase a fare on a public transportation system may also be integrated with a navigation system to help guide a transit system rider and to inform the rider of an incorrect direction or location. In an embodiment, when the transit rider keys in a destination on the mobile electronic device, an application in the mobile electronic device may use wireless communications to access a route map from the transportation system to determine the best route to take to reach the requested destination. The route information could be stored in a memory on the mobile electronic device for later access. The recommended route may include several modes of transportation (e.g., bus, light rail, subway) and possibly one or more transfers at bus stops or train stations. If the rider also uses the mobile electronic device to purchase a transit fare, the application in the mobile electronic device can determine that the requested ticket does not agree with the original route and destination information and alert the rider before the incorrect ticket is purchased. The application in the mobile electronic device can then refresh the directions to provide the correct transit route, transfer, vehicle, or station to the rider.

In another embodiment, once the application in the mobile electronic device determines a transit route and the rider proceeds onto a transit vehicle, a self-location component (e.g., global positioning system receiver) in the mobile electronic device can identify the sequence of locations of the rider. The application can compare the sequence of locations of the mobile electronic device to the proposed route stored in the memory of the mobile electronic device to determine if the rider is moving in the correct direction that will lead to the final destination. If the rider is moving in the wrong direction, the application in the mobile electronic device can alert the rider of the error and recommend a new route or transfer that would enable the rider to reach the final destination. A variety of self-location techniques may be employed by the mobile electronic device including global positioning system (GPS) location techniques, location techniques based on serving cell tower and/or cell sector, location techniques such as cell tower trilateration, and other known location techniques. In an embodiment, self-location cues may be provided as radio frequency identification (RFID) tags at transit system stations and/or on transit vehicles.

Turning now to FIG. 1, a system 100 for integrating public transit navigation with a mobile device used for transit payment is described. The system 100 comprises a mobile electronic device 102, a transit station 120, a transit vehicle 130, a base transceiver station 140, a network 150, a transit system server 160, and a route map database 162. The mobile electronic device 102 may be comprised of a near-field-communications transceiver 104, a global positioning system (GPS) receiver 106, a display screen 108, an application 110, and a route map memory 112 and may be implemented as a mobile phone, personal digital assistant, a media player, or any other mobile device having wireless communication capability. A mobile phone is discussed in detail hereinafter. In an embodiment, the mobile electronic device 102 comprises a transit card application (not shown) that may be used to make payments for using the transit system, for example to pay fares. In an embodiment, the transit card application may be encapsulated within and/or combined with the application 110, and the functionality of the transit card may be provided by the application 110.

The transit station 120 may be a bus station or rail station and may be comprised of a radio frequency identification (RFID) tag 122 and a fare gate 124. The transit vehicle 130 may be a bus or train and may be comprised of a radio frequency identification (RFID) tag 132 and a fare terminal 134. The mobile electronic device 102 may be used to pay a transit fare, via near-field communications, at and either the fare gate 124 at the transit station 120, or the fare terminal 134 on the transit vehicle 130. The global positioning system (GPS) receiver 106 acts as a self location component for the mobile electronic device 102. The application 110 may be used to obtain a route map and to determine if the transit rider is in the correct location. The destination may be read from a ticket and/or communicated to the mobile electronic device 102 by a ticket purchase system, for example by a ticket kiosk at a transit system station.

In an embodiment of the system 100, a transit rider may input a destination address or location in the mobile electronic device 102. The application 110 in the mobile electronic device 102 can communicate through the base transceiver station 140, the network 150, and the transit system server 160 to obtain a route map from the route map database 162. Alternatively, the application 110 can communicate through the fare terminal 134 and/or the fare gate 124 to obtain a route map from the route map database 162. The route map information may be stored in the route map memory 112 of the mobile electronic device 102. The proposed route may contain one or more modes of transportation (e.g., bus, light rail), may include one or more transfers, and may be presented to the user on the display screen 108. If the mobile electronic device 102 is used to pay a transit fare for the route requested by the rider, the application 110 may determine that the rider is purchasing a ticket for a transit vehicle that is not part of the requested route. The application 110 may send an audible alert and/or a message on the display screen 108, that the location or vehicle information does not agree with the original route and destination information. In an embodiment, the rider is alerted of an error in location before purchasing a ticket so as to avert having to request a transfer or a payment refund. The application 110 in the mobile electronic device 102 can then recalibrate the directions to determine the correct transit route, transfer location, vehicle, or station, and then present the new information on the display screen 108.

In another embodiment of integrating navigation with the mobile electronic device 102, the near-field communications transceiver 104 in the mobile electronic device 102 can communicate through the fare gate 124 or the fare terminal 134 to obtain a route map from the route map database 162. As the rider proceeds on the proposed route, the succession of locations of mobile electronic device 102 may be identified by the global positioning system receiver 106. Alternatively, the succession of locations could be determined using trilateration techniques based on the mobile electronic device 102 analyzing pilot signal strengths emitted by a plurality of known base transceiver stations 140. The succession of locations may be determined by other location techniques, including location based on serving cell tower and/or cell sector. In an embodiment, relatively vague and limited indications of location may be sufficient to draw an inference of navigation in the correct direction or wrong direction.

Additionally, other information such as a transit station identity, a level identity, for example a level in a subway station, and/or a platform identity, for example a subway station platform, may be used to draw an inference of navigation in the correct direction or wrong direction. In an embodiment, transit station identity, level identity, and/or platform identity may provide an earlier indication of navigation error that the application 110 may use to avert boarding the wrong transit vehicle and traveling further away from a desired destination, thereby obliging backtracking to the transit station, level, and/or platform before taking steps to get to the correct transit station, level, and/or platform.

The application 110 can compare the succession of locations of the mobile electronic device 102 to the proposed route stored in the route map memory 112, to determine if the rider is moving in the direction that will lead to the correct destination. If the rider is moving in the wrong direction, the application 110 can activate an audible alert and/or send a message to the display screen 108 to notify the rider of the error and then present a new route, transfer location, or vehicle identification that would enable the rider to reach the correct destination.

In an embodiment, mobile electronic device 102 may be able to exchange route information via near field communications. For example, a city resident may share a route saved in their mobile electronic device 102 with the mobile electronic device 102 belonging to a visitor from another city, for example a tourist or a relative, to help the visitor navigate to a tourist site or to the workplace of the city resident. The mobile electronic device 102 may support storing commonly used routes in local memory. The mobile electronic device 102 may support organizing links and/or shortcuts to commonly used routes on a user interface.

Figure 2:
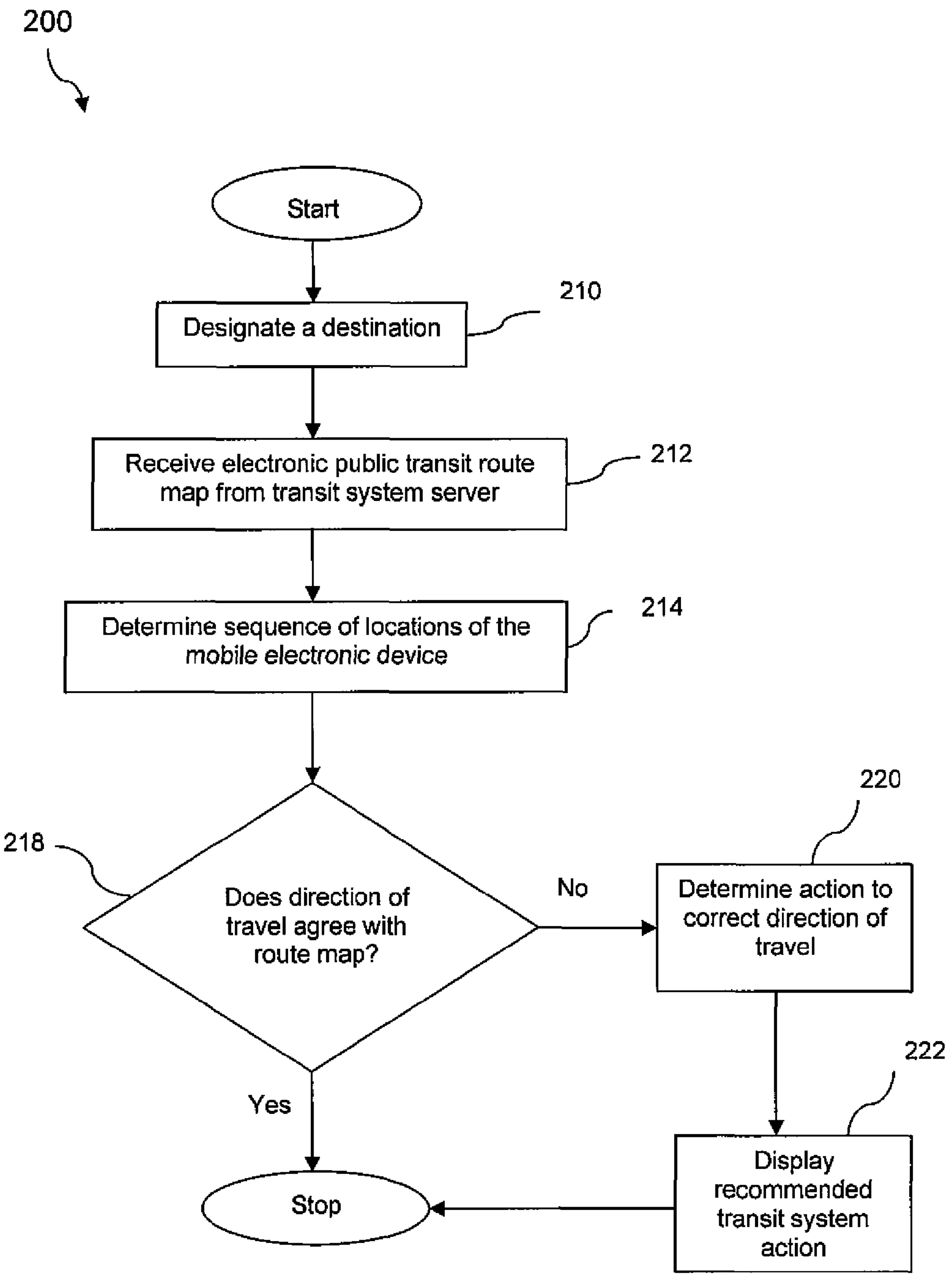
FIG. 2. is a flow chart of a method of navigation feedback according to an embodiment of the disclosure.

Turning now to FIG. 2, a method 200 of providing navigation feedback is discussed. At block 210, the mobile electronic device 102 receives a destination request. The mobile electronic device 102 could be one that is also used to purchase transit fares. Moving to block 212, the mobile electronic device 102 may request and receive an electronic public transit route map, via wireless communications, from the route map database 162 kept by the transit system server 160. The route map may include only the specific route requested or it may be a comprehensive map of a complete transit system. In an embodiment, route information may be preconfigured into the mobile electronic device 102 or the application 110 and may be stored in the route map memory 112 in the mobile electronic device 102. The route map may include the appropriate mode of transportation to use (e.g., bus, light rail), when and where to board, and when and where to transfer, if applicable. For example, the route map may consist of boarding bus #1 at the X train station, then transferring to bus #2 at the Y train station, and then proceeding 100 yards by foot to the final destination. At block 214 the global positioning system receiver 106 may identify the sequence of locations of the mobile electronic device 102 as the transit rider follows the proposed route. In block 218, the application 110 in the mobile device 102 may compare the succession of locations of the transit rider to the recommended route as stored in the route map memory 112, to determine if the transit rider is heading in the right direction. If the direction of the transit rider is incorrect, the method moves to block 220 where the application 110 determines the actions the transit rider should take to correct the direction of travel. For example, the application 110 may use the information stored in the route map memory 112, to determine that the rider should exit the train at station A and then transfer to train #2 to reach the correct destination. In this scenario, the method moves to block 222, wherein the notification of the recommended transit system action is presented on the display screen 108.

Figure 3:
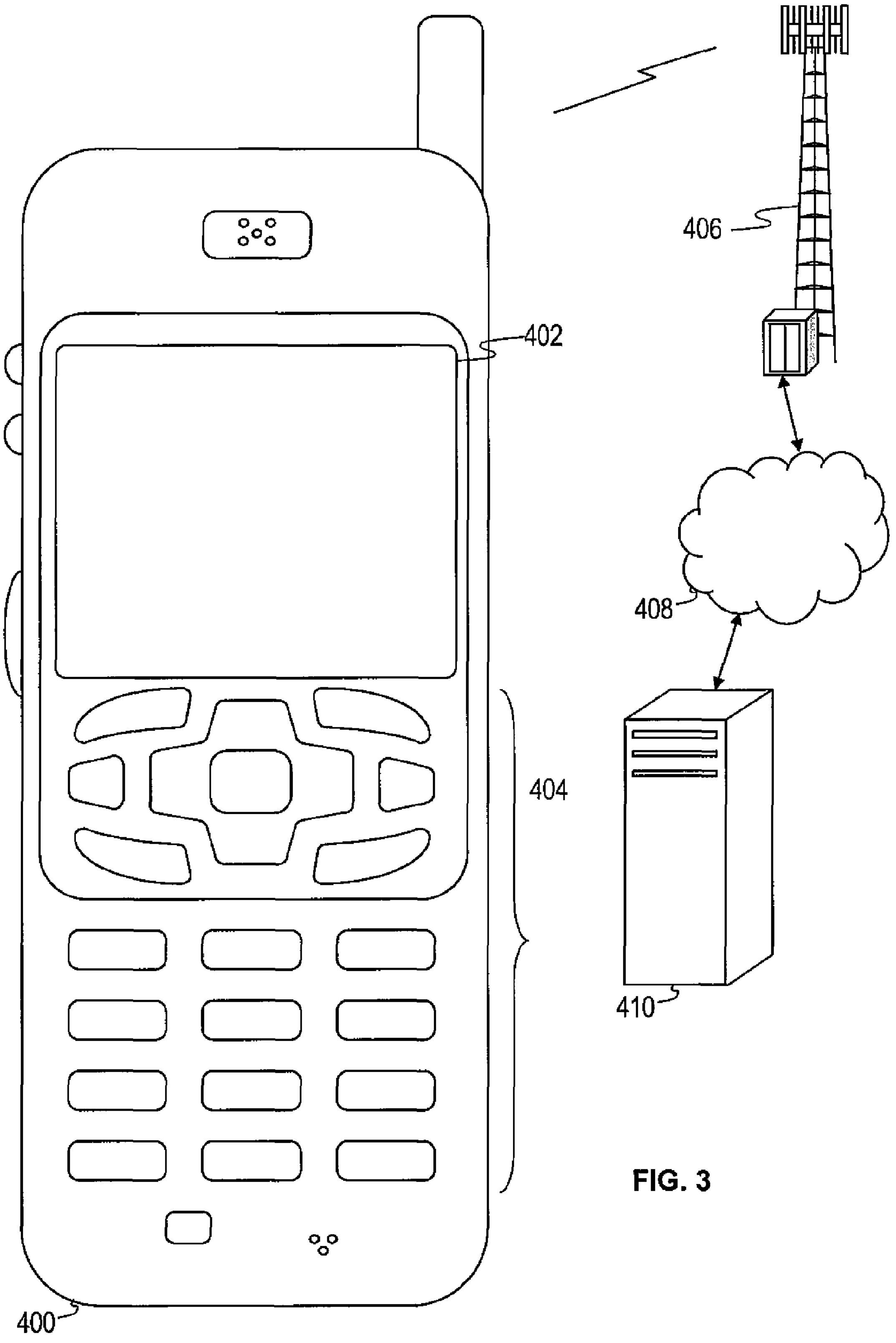
FIG. 3 illustrates a handset suitable for implementing an embodiment of the disclosure.

FIG. 3 shows a wireless communications system including the mobile device 400 which may be similar to the mobile device 102 in FIG. 1. FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the Internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 4:
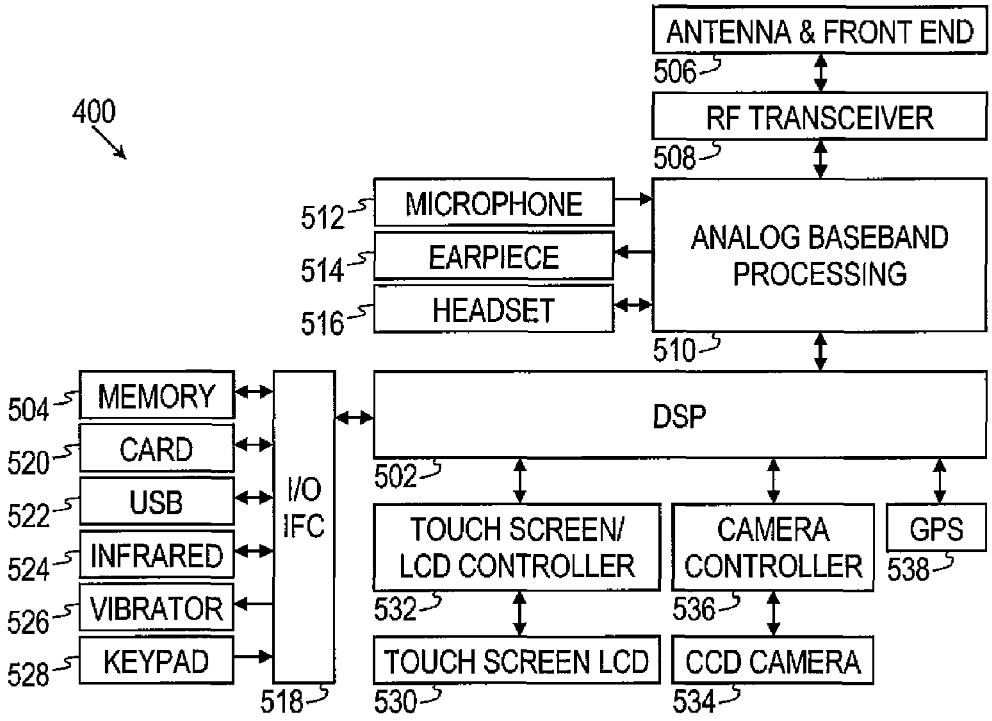
FIG. 4 is a block diagram of a handset suitable for implementing an embodiment of the disclosure.

FIG. 4 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 5:
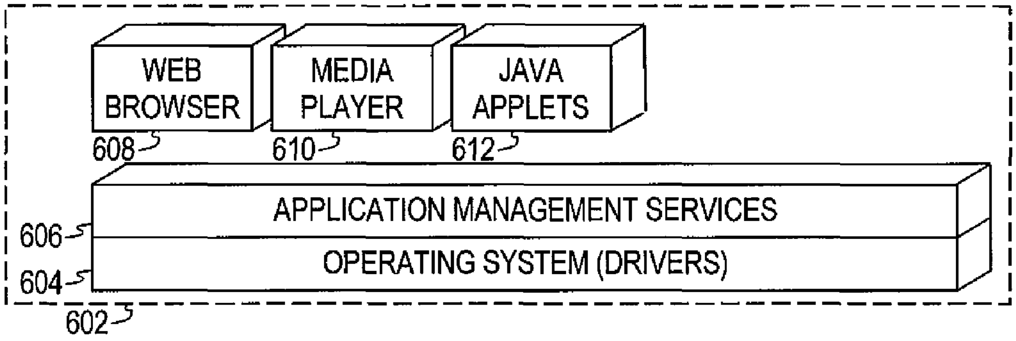
FIG. 5 is a block diagram of a software architecture of a handset suitable for implementing an embodiment of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 5 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 6:
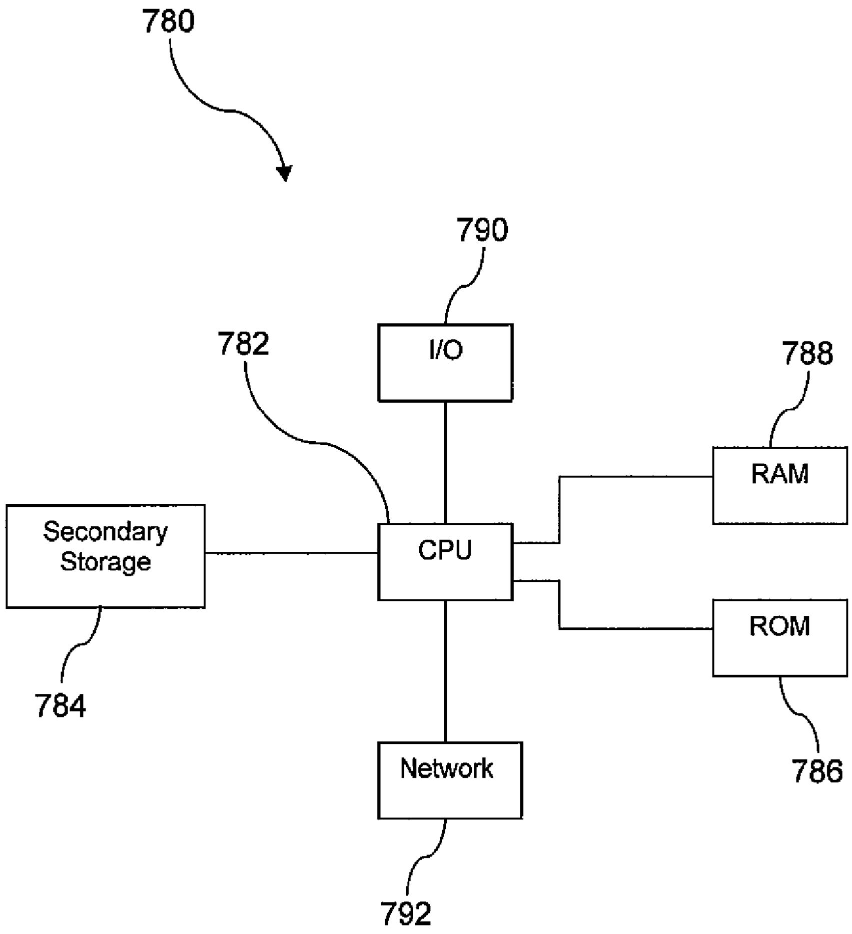
FIG. 6 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O)

devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile electronic device, comprising:

a near-field-communication transceiver to request and receive a route map from a transit system, wherein the near-field communication transceiver is further configured to receive identification information from at least one of a transit vehicle and a transit platform a self-location component; and an application that, when executed on the mobile electronic device, receives a transit destination entered into the mobile device, analyzes a plurality of locations of the mobile electronic device at a succession of times provided by the self-location component to determine a direction of motion of the mobile electronic device, and presents a notification on the mobile electronic device that the route map and the direction of motion of the mobile electronic device do not agree with the transit destination wherein the application, when executed on the mobile electronic device, further receives a second transit destination entered into the mobile electronic device, based on the identification information and the route map presents a notification on the mobile electronic device that the identification information does not agree with the second transit destination, determines that a requested ticket does not agree with a route and the second transit destination, and provides an alert before an incorrect ticket is purchased.

2. The mobile electronic device of claim 1, wherein the self-location component is a global positioning system (GPS) receiver.

3. The mobile electronic device of claim 1, wherein the self-location component relies upon analyzing signal strengths associated with a plurality of base transceiver stations.

4. The mobile device of claim 1, further including a memory, wherein the route map is stored in the memory and received by the mobile electronic device from the transit system.

5. The mobile device of claim 1, wherein the application, when executed on the mobile electronic device, further informs a user of an at least one transfer required to reach a destination.

6. The mobile electronic device of claim 1, wherein the mobile electronic device is one of a mobile phone, a personal digital assistant, a laptop computer, a tablet computer, a media player, and a personal digital television.

7. The mobile electronic device of claim 1, wherein the transit vehicle is one of a bus and a light rail.

8. The mobile electronic device of claim 1, wherein the application, when executed on the mobile electronic device, further obtains the identification information by means of a radio frequency identification (RFID) tag from the at least one of the transit vehicle and the transit platform.

9. The mobile device of claim 1, further including a display screen to notify a user of an incorrect transit vehicle or an incorrect transit direction.

* * * * *